United States Patent [19]
Chen et al.

[11] Patent Number: 5,742,278
[45] Date of Patent: Apr. 21, 1998

[54] FORCE FEEDBACK JOYSTICK WITH DIGITAL SIGNAL PROCESSOR CONTROLLED BY HOST PROCESSOR

[75] Inventors: Elaine Y. Chen, Boston; Bin An; Timothy R. Osborne, both of Arlington; Paul DiLascia, Reading; Matthew Coill, Tyngsboro, all of Mass.

[73] Assignee: Microsoft Corporation, Redmond, Wash.

[21] Appl. No.: 502,430

[22] Filed: Nov. 1, 1995

Related U.S. Application Data

[63] Continuation-in-part of Ser. No. 187,646, Jan. 27, 1994, abandoned.

[51] Int. Cl.$^6$ .................................................. G09G 5/00
[52] U.S. Cl. ........................ 345/156; 345/157; 345/161
[58] Field of Search .................................. 345/156, 157, 345/159, 161, 162, 163, 167, 184; 463/30, 36–39; 128/782; 434/45; 364/274, 274.1, 275, 275.1, 275.2

[56] References Cited

U.S. PATENT DOCUMENTS

| | | | |
|---|---|---|---|
| 4,398,889 | 8/1983 | Lam et al. | 434/45 |
| 4,504,233 | 3/1985 | Galus et al. | 434/45 |
| 5,022,407 | 6/1991 | Horch et al. | 128/744 |
| 5,125,843 | 6/1992 | Holloway | 434/45 |
| 5,275,174 | 1/1994 | Cook | 128/744 |
| 5,354,162 | 10/1994 | Burdea et al. | 414/5 |
| 5,396,266 | 3/1995 | Brimhall | 345/161 |
| 5,405,152 | 4/1995 | Katanics et al. | 463/30 |
| 5,499,919 | 3/1996 | Thomas | 435/45 |
| 5,589,828 | 12/1996 | Armstrong | 345/161 |

OTHER PUBLICATIONS

Agronin, Michael L., "The Design of a 9-String 6-Degree-of-Freedom Force-Feedback Joystick for Telemanipulation," Proceedings of the Workshop on Space Telerobotics, Jul. 1987, Present at California Institute of Technology, pp. 1–8.

Iwata, Hiroo, "Artificial Reality with Force-feedback: Development of Desktop Virtual Space with Compact Master Manipulator," SIGGRAPH '90, Dallas, Aug. 6–10, 1990, Computer Graphics, vol. 24, No. 4, Aug. 1990, ©Association for Computing Machinery, pp. 165–170.

Burdea, Grigore, et al., "A Portable Dextrous Master with Force Feedback," Presence Teleoperators and Virtual Environments, vol. 1, No. 1, Winter 1992, MIT Press Premier Issue, pp. 18–28, ©1992 Massachusetts Institute of Technology.

(List continued on next page.)

*Primary Examiner*—Richard Hjerpe
*Assistant Examiner*—Ricardo Osorio
*Attorney, Agent, or Firm*—Ronald M. Anderson

[57] ABSTRACT

A force feedback joystick unit connected to the serial port of a personal computer applies a variety of force effects to the joystick handle in response to commands from the executing personal computer program. Forces are applied to the joystick, which is mounted on a gimbal support for movement in two degrees of freedom, by a pair of drive motors which operate under the control of a digital signal processor (DSP). The DSP is programmed to respond to predetermined commands issued by a program executing on the personal computer to produce basic force effects including a constant force, a spring force proportional to the displacement of the joystick handle from a reference, a damping force proportional to the velocity of the joystick, and a time varying force effect having a selectable waveform, magnitude and period. More complex forces effects are produced by combining the basic effects. Custom force effects can be defined by the executing application program, the definitions being downloadable from the personal computer into the DSP which thereafter produces the defined custom force effect upon subsequent command from the personal computer. Multiple force effects, including both basic predefined effects and complex custom effects can be simultaneously operative and can be independently initiated and terminated by commands from the personal computer.

19 Claims, 5 Drawing Sheets

OTHER PUBLICATIONS

Ellis, R.E. et al., "Design and Evaluation of a High–Performance Prototype Planar Haptic Interface," Advances in Robotics, Mechatronics, and Haptic Interfaces, DSC–vol. 49, ASME 1993, pp. 55–64.

Iwata, Hiroo, "Pen–Based Haptic Virtual Environment," IEEE 1993, pp. 287–292.

Tan, Hong Z. et al., "Manual Resolution of Compliance When Work and Force Cues are Minimized," Advances in Robotics, Mechatronics, and Haptic Interfaces, DSC–vol. 49, ASME 1993, pp. 99–104.

Schmult, Brian et al., "Application Area for a Force–Feedback Joystick," Advances in Robotics, Mechatronics, and Haptic Interfaces, DSC–vol. 49, ASME 1993, pp. 47–54.

Kotoku, Tetsuo et al., "Environment Modeling for the Interactive Display (EMID) Used in Telerobotic Systems," IEEE Nov. 3–5 1991, pp. 999–1004.

Kotoku, Tetsuo, "A Predictive Display with Force Feedback and Its Application to Remote Manipulation System with Transmission Time Delay," IEEE Jul. 7–10 1992, pp. 239–246.

Itawa, Hiroo et al, Volume Haptization, IEEE 1993, pp. 16–19.

Burdea, Grigore et al., "Distributed Virtual Force Feedback," IEEE May 2, 1993, Atlanta, GA, pp. 25–44.

Adelstein, Bernard D. et al., "Design and Implementation of a Force Reflecting Manipulandum for Manual Control Research," ASME Winter Annual Meeting, Nov. 1992, Aneheim, CA.

Adelstein Bernard D., "A High Performance Two Degree–of–Freedom Kinesthetic Interface," Massachusetts Institute of Technology, Cambridge, MA, pp. 108–113.

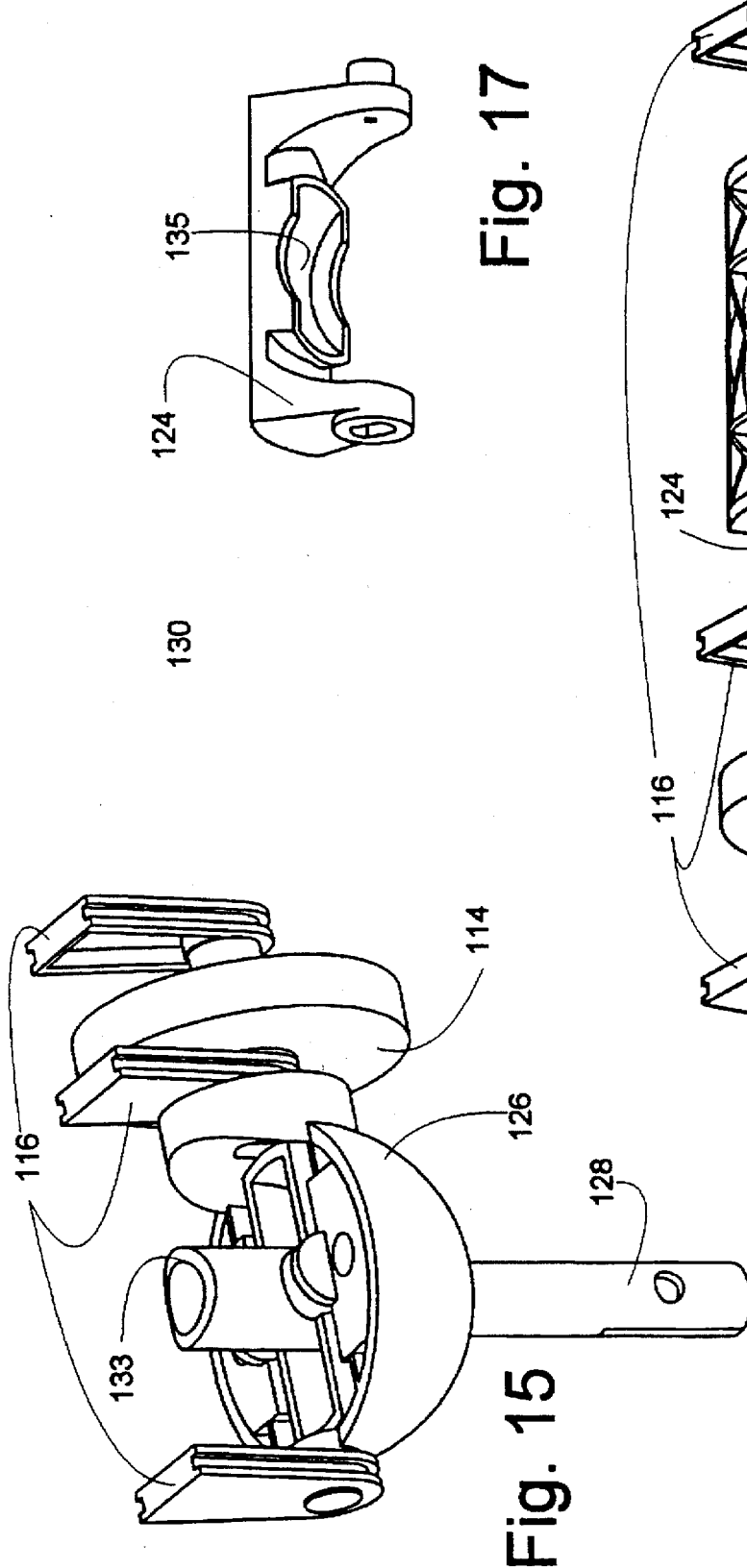
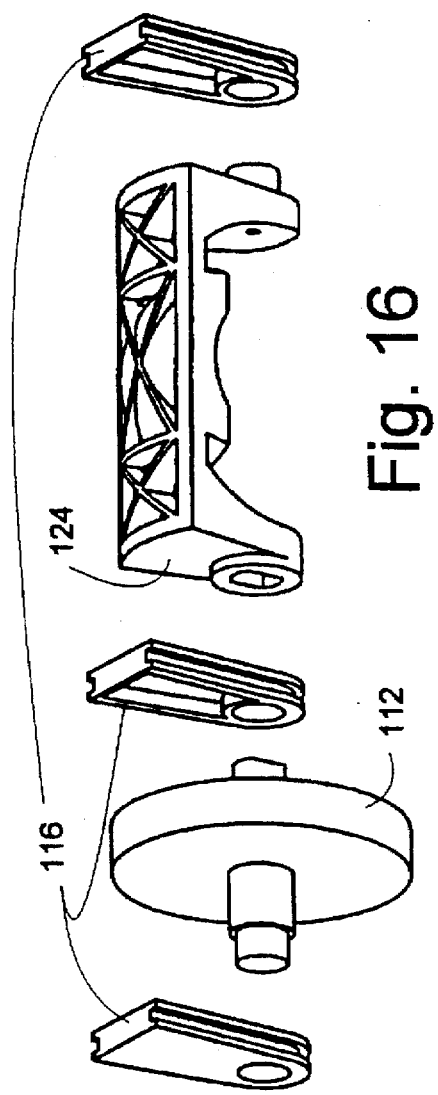
Fig. 15
Fig. 16
Fig. 17

FORCE FEEDBACK JOYSTICK WITH DIGITAL SIGNAL PROCESSOR CONTROLLED BY HOST PROCESSOR

CROSS REFERENCE TO RELATED APPLICATIONS

This application is a continuation in part of U.S. application Ser. No. 08/187,646 filed Jan. 27, 1994 by Elaine Chen et al., now abandoned.

REFERENCE TO MICROFILM APPENDIX

This specification includes a listing of computer programs which are presented in an accompanying microfilm appendix consisting of 261 frames on 6 microfiche.

COPYRIGHT AUTHORIZATION

The computer program listings contained in the above-noted microfiche appendix, as well as other portions of this patent document, contain material which is subject to copyright protection. The copyright owner has no objection to the facsimile reproduction by anyone of the patent document or the patent disclosure, as it appears in the patent and Trademark Office patent file or records, but otherwise reserves all copyright rights whatsoever. Copyright—1995—Exos, Inc.

BRIEF SUMMARY OF THE INVENTION

The present invention takes the form of an input/output control unit for a computer which includes a manually manipulated control member to which computer-controlled forces are applied in at least one degree of freedom. In accordance with a principle feature of the invention, the control unit is equipped with its own internal processor which receives and responds to commands from a connected host processor. The internal processor controls the operation of one or more drive motors to create force effects in response to commands from the host processor.

The force effects preferably consist of a group of standard effects which the internal processor is pre-programmed to provide, together with additional custom effects which are defined by the host processor and downloaded to the internal processor for subsequent invocation on command from the host processor. Both the built-in effects and the newly defined custom effects are formed by the activation of one or more primary force effects selected from a group consisting of (1) a constant force effect, (2) a spring force effect in which a component of the applied force varies in direct proportion to the displacement of the manipulated member from a reference position, (3) a damping force effect in which a component of the applied force varies in direct proportion to the velocity of the manipulated member, and (4) a time varying "rumble" force effect defined by selecting a waveshape, amplitude and frequency of a time-varying force.

The principles of the present invention may be additionally employed to create force effects which exhibit the behavior of defined physical objects having a boundary (e.g., an infinite line, circle or hole, or a convex polygon) and which generates an outward force normal to the boundary when the control member is adjacent to the boundary.

In accordance with the invention, a plurality of different force effects may be applied to the control simultaneously in response to a sequence of overlapping force effect commands from the host processor. The utilization of a dedicated processor frees the host processor from the computational burden of controlling such complex effects, thereby enabling the host processor to more effectively perform complex concurrent tasks, such as the control of a graphics game display, while the control unit's internal processor controls the forces applied to the manipulated control member in response to invocation commands issued by the host processor to initiate and terminate predefined force effects.

As further contemplated by the invention, communications between an application program executing on the host processor and processes executing on the dedicated processor are facilitated by a set of standard interface routines which may be dynamically or statically linked to any application program which can usefully employ the control unit. These interface routines provide a convenient set of force effects, as well as the facility for defining and invoking custom force effects, and for obtaining current state information on the position of, and the force being applied to, the control member, which are easily incorporated by programmers into electronic games, simulators, and other application programs which benefit from the enhanced sense of reality that programmed force effects provide.

The preferred embodiment of the invention to be described takes the form of a joystick driven by a pair of motors in two degrees of freedom under the control of an internal digital signal processor which communicates with a host computer, such as a personal computer, over a conventional low speed serial link. The joystick is gimbal mounted for movement in two degrees of freedom with computer generated forces being applied by means of a pair of low-backlash gear clusters, each of which is coupled between the gimbal mount and a DC drive motor powered under the control of the digital signal processor. The invention provides a rich set of complex force effects under the control of the program executing on the host processor without slowing time-critical processing, such as the generation of graphical images, and without adding significant complexity to the application program.

BRIEF DESCRIPTION OF THE DRAWINGS

These and other objects, features and advantages of the invention will be better understood by considering the following detailed description. During the course of this description, reference will frequently be made to the attached drawings in which:

FIG. 15 is an isometric view of the cup gimbal subassembly utilized in the joystick support mechanism;

FIG. 16 is an exploded isometric view of the U bracket gimbal subassembly; and

FIG. 17 is an isometric view showing the socket formed in the U bracket for engaging the end of the joystick rod.

DETAILED DESCRIPTION

Figure 1:
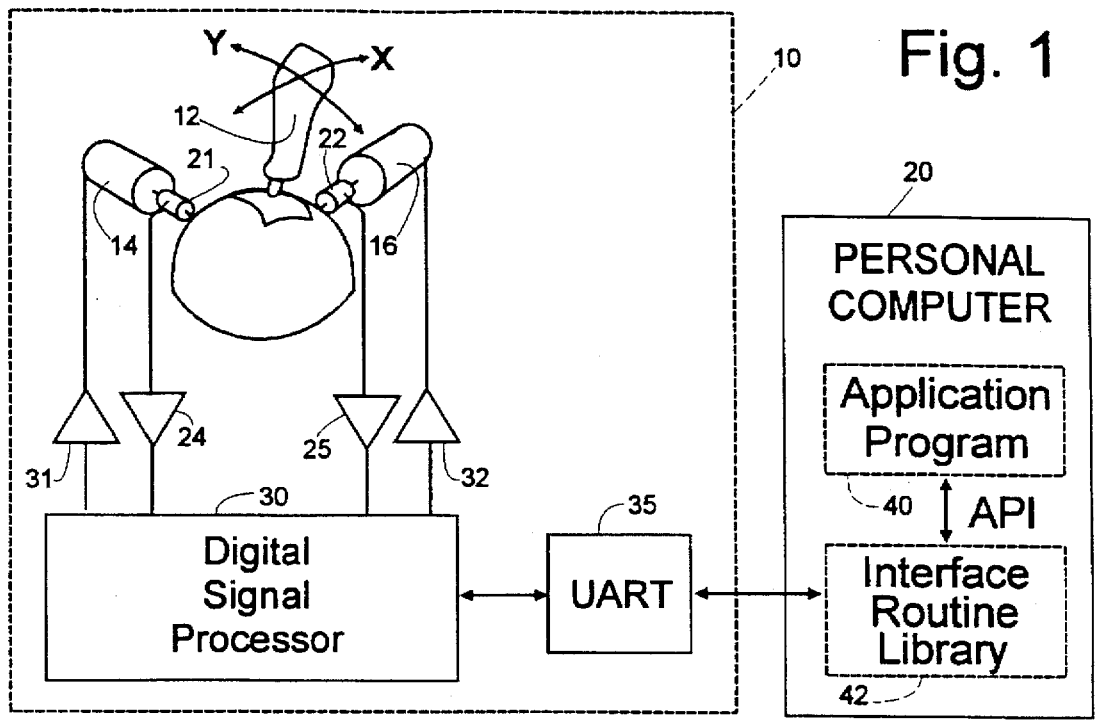
FIG. 1 is a block schematic diagram of the preferred embodiment of the the invention.

FIG. 1 of the drawings shows the principle components of a preferred and illustrative implementation of the principles of the present invention which consists of a force-feedback joystick unit 10 and a programmed personal computer 12.

The joystick unit 10 is manually manipulated by means of an upwardly extending handlegrip 12 which is mounted for movement in two degrees of freedom which may be conveniently represented by cartesian coordinates in which the positive x direction points to the user's right and the positive y direction points forward (away from the user). Bidirectional forces are applied in both the x and y directions to handlegrip 12 by means of motors 14 and 16 respectively which are coupled to the handlegrip by a gimballed mount indicated at 18 in FIG. 1. Sensors 21 and 22, which may take the form of optical encoders or the like, provide rotational position signals indicative of the instantaneous x and y positions of the handlegrip 12. The position signals from sensors 21 and 22 are processed by sensor input modules 24 and 25 respectively and passed to the input ports of a DSP (digital signal processor) 30. The DSP 30 produces output signals which are passed via amplifiers 31 and 32 to control the forces applied by the drive motors 14 and 16 respectively to the handlegrip 12.

The joystick unit 20 is connected to the serial RS-232C serial port of a conventional personal computer by means of a conventional UART (universal asynchronous receiver transmitter) 35 which exchanges information in bit serial format with the personal computer 20 and in byte format with an input/output port of the DSP 30.

Application programs, such as the program indicated at 40 in FIG. 1, which execute on the processor in the personal computer 20 are preferrably written to respond to and control the joystick unit 10 by making standard procedure calls to a standard library of interface routines 42, which may be statically linked with the application programs at compilation time, or by dynamically linking the library and application program code at runtime. In accordance with the invention, a wide variety of application programs can thus be written to make effective use of the force-feedback joystick using a standard set of easily understood application program interface (API) function calls which may be conveniently expressed in the same language used by the application programmer for conventional programming.

FORCE EFFECTS

Because the creation of realistic force effects places such a high computational burden on the processor used to control the drive motors 14 and 16, an attempt to perform force control calculations on the same processor used to execute an application program such as a video game would yield unacceptable performance. Too much processing power would be required to accept position and force values, compute new ones, and send the appropriate commands back to the joystick unit quickly enough to create smooth force effects without seriously degrading the performance of the application program.

As contemplated by the present invention, an application program 40 may utilize the API provided by the interface routines 42 to define and invoke force effects. The routines 42 package the functions requested via the API into a message which complies with a serial communications protocol used for communications between with the DSP 30 and the personal computer 20 via the UART 35. A force effect is identified by a unique identification code when the effect is created. Once created, the effect is downloaded into DSP 30 where it resides, ready to be invoked, until it is explicitly destroyed at the request of the application program (or the power is turned off). When an application program invokes or "plays" a force effect, control returns immediately to the calling application program, freeing the personal computer processor for other functions while the force continues "playing" until it either times out or the application program explicitly terminates the effect. Because the computational burden required for actually creating the force effect is born by the DSP 30 rather than by the host processor, the benefits of a force-feedback joystick are provided without slowing down processes, such as the processing needed for game graphics.

In accordance with the invention, the application program can request and the joystick unit 10 can produce several force effects at the same time. Force effects are additive; that is, when two effects are invoked at the same time, the forces are added in the areas where the effects overlap. Force effects can be invoked and terminated on an individual basis. As an example, an effect emulating a springy damper might be already running at the time when a "rumble" effect is invoked to simulate an earthquake. On top of both effects, a short pulse might be invoked to simulate a sudden jolt. The total force applied by the stick is lim9ited to a saturation value $F_s$ which is selected based on data on human perception of forces.

BASIC FORCE EFFECTS

The API provided by the routine library 42 lets programmers create and define many complex force effects, all of which are derived from three fundamental kinds of resistance or force types, corresponding to the three degrees of differential equations:

| | |
|---|---|
| F = C | constant force |
| F = Kx | spring: force is proportional to displacement |
| F = Bdx | damper: force is proportional to velocity | here C, K and B are constants, x is the displacement in some direction, and dx is the first derivative of x (i.e. velocity in the x direction). These basic forces are adequate for modeling most types of forces required by games and simulation programs. In the case of a spring, a reference or center is assumed, and the default "center" is the physical center position of the handlegrip 12.

A constant force makes the joystick resist movement evenly, like pushing an object across a table. A constant force that lasts only briefly (0.1 seconds, say) creates a pulse or jolt.

A spring force makes the stick resist more the further the stick is pushed from the reference point of the spring. If the user releases the stick, it returns to the center position.

A damping force resists more if the stick is pushed quickly, but less if pushed slowly. If the user steps pushing, the joystick does not return to the center position, but stays where it is. Damping produces an effect similar to mud or quicksand.

The constants C, K and B are used to specify the characteristics of force effects. Separate values can be given for each coordinate axis to produce two dimensional forces. Thus, for example, K actually has the components Kx and Ky, the springiness in each direction.

In addition to the three basic force types (constant force, spring and damper), the joystick unit 10 provides one more basic force effect: rumble. These four effects provide the building blocks from which all force effects are created. The RUMBLE effect is a constant force with a time profile, a waveform that's used to modulate the constant force, which may be a square, triangle, sine, ramp up and ramp down waveform. Time profiles create rumbling or vibrating effects by specifying the amplitude and frequency of the wave, both of which can be randomized to create more realistic non-uniform effects. Ramp up and ramp down waveforms can be used to generate gradually increasing or decreasing force by using only one period of the waveform.

Each force effect requires its own parameters to fully specify the effect. In this respect, a force effect can be viewed as being a process or subroutine. Constant force, for example, is defined by the parameters axis ID (x or y), C (constant of force) and duration. These parameters are passed from the application program 40 to the DSP 30 by invoking an API procedure call. All parameters passed to the DSP are 16 bit values. Alternatively, the application program can create a new effect in which only some of the parameters are supplied at the time the definition of the effect is downloaded to the DSP 30. For example, the calling application program might create a new effect called LEFTPUNCH that's defined with a constant force of 15 along the x axis, for a duration of 0.1 seconds. In this case, all three parameters are specified at creation, so when the program later invokes LEFTPUNCH, there's no need to supply any parameters. In contrast, a different force effect called VARIABLEPUNCH could be defined using a fixed duration and axis, but requiring the parameter C to be supplied when VARIABLEPUNCH is invoked.

CREATING NEW FORCE EFFECTS

The basic effects (constant force, spring, damper and rumble) may be used to create a wide variety of effects adequate for many different application, and the application programmer can combine these effects to create more specialized force effects. Effects can be combined serially or in parallel. When force effects are combined, all of the variable parameters for all of the effects in the compound effect must be sent. If effect F is made of effects A, B and C; B is made of X and Y; A has parameters a1 and a2; X has no parameters; Y has the parameters y1, y2 and y3; and C has c1, then F must be invoked with parameters a1, a2, y1, y2, y3 and c1, in that order.

| If A = A(a1,a2) | (A has two parameters) |
|---|---|
| X = X() | (X has no parameters) |
| Y = Y(y1,y2,y3) | (Y has three paramerters) |
| B = X + Y = B(y1,y2,y3) | (B= X+Y has three parameters) |
| C = C(c1) | (C has one parameter) |
| Then F = A + B + C = F(a1,a2,y1,y2,y3,c1) | (F has six parameters) |

If any of (a1, a2, y1, y2, y3, c1) are given values when F is defined, then they become fixed parameters and only the remaining (variable) parameters need be specified when F is invoked. For example, if a1=4 and y2=7 when F is defined, only four parameters (a2, y1, y3, c1) need be passed when F is invoked.

The embodiment of the invention which is described here operates in two degrees of freedom: x and y. However, in the API, axes are specified by identification number in order that programs be upwardly compatible with systems which support more degrees of freedom. The coordinate system is centered at zero and ranges from -maxRange to maxRange in each direction, where maxRange is a value returned by the GetDeviceInfo API function. (0,0) is the center of the joystick.

C API

In the program source language listings in the microfiche appendix, the C language header file PWRSTICK.H defines the format of each API call may be included in the C language source listing of the application program so that the joystick interface routines in the library 42 are properly linked into and made part of the executable application program 40. Application program examples presented below illustrate the manner in which the API is used to invoke particular functions.

One of the built-n force effect that are predefined within the DSP 30 is the effect FE_CONSTANT_FORCE. This effect requires three parameters: the axis ID for the force, the strength (C) and duration. In C, this effect is identified by a predefined symbol FE_CONSTANT_FORCE that's defined in PWRSTICK.H.

```
#define FE_CONSTANT_FORCE 0x0001    // (duration, axisID, F)
```

The following C-language code invokes this effect:

```
int nExpected;        // number of parms expected, should be 3
PSPID pid;            // process ID of running effect PSPARAMS
params[3];            // effect parameters
params[0] = 100;      // duration = .1 sec
params[1] = PS_X_AXIS; // along x-axis
params[2] = 15;       // force = 15
// now start it
pid = PSStartEffect(FE_CONSTANT_FORCE, &params, 3,
&nExpected);
```

Effect parameters have the type PSPARAM, and are passed as an array. In order to make programming easier and less error-prone, the API defines a C structure to go with every force effect. For FE_CONSTANT_FORCE, there's a struct EP_CONSTANT_FORCE.

```
struct EP_CONSTANT_FORCE {   // params for
                             EF_CONSTANT_FORCE
    PSPARAM duration;        // duration in msec
    PSPARAM axisID;          // which axis
    PSPARAM C;               // force
};
```

Every built-in FE_force effect has a corresponding EP_ (Effect Parameters) struct. The same convention is used for programmer defined effects. A constant force effect can be invoked as follows:

```
int nExpected;             // number of parms expected, should be 3
PSPID pid;                 // process ID of running effect
EP_CONSTANT_FORCE params;  // parameters
params.duration = 100;     // duration = .1 sec
params.axisID = PS_X_AXIS; // along x-axis
```

```
params.C = 15;            // force
// now start it
pid = PSStartEffect(FE_CONSTANT_FORCE, (PSPARAM*)¶ms,
3, &nExpected);
```

The first argument to PSStartEffect is the ID of the force effect; the second is a pointer to an array of PSPARAMs that contains the parameters for that effect; the third is the number of parameters; the last argument is a pointer to an integer which PSStartEffect sets to the number of parameters expected, which in this case should be 3. nExpected can be used when debugging to check that the correct number of parameters were passed.

PSStartEffect returns an PSPID (process ID) that identifies the running force. The process ID is different from the effect ID because the same effect may be running several times. Each one uses the same effect ID, but they have different process IDs.

When a force effect is invoked with PSStartEffect, the effect starts running and control returns immediately to the program. The effect runs until it either times out (the duration parameter expires) or you explicitly stop the force by calling PSStopEffect.
err=PSStopEffect (pid);

All the parameters need not be supplied every time a force effect is invoked. For example, a new force, PULSEX, may be defined to create a constant force in the x-direction for 0.1 seconds with a variable strength. To do this, a new function, PSCreateEffect is used:

```
static EFFECTID FEPulseX;   // ID of new effect, assigned by API
static EP_CONSTANT_FORCE EPPulseX '2 {;
// parameters to defineFEPulseX
    100,            // duration = 100 msec = .1 seconds
    PS_X_AXIS       // force applied in x-direction
    PSVARIABLE,     // strength will be supplied when effect is
invoked
};
    int nExpected;     // number of params expected, should be 3
EFFECTID idArray[2];   // array to hold IDs to combine
idArray[0] = FE_CONSTANT_FORCE;   // we want to modify constant
force effect idArray[1] = 0;   // terminate array (only one effect
                                    "combined")
// During program initialization:
FEPulseX = PSCreateEffect(
```

```
    idArray,            // array of effect IDs to combine
    PSPARALLEL,         // combine forces in parrallel    (
    PSPARAM*)&EPPulseX, // effect parameters
    3,                  // number of parameters
    &nExpected);        // num of params expected (returned)
```

PSCreateEffect takes an array of effect IDs to combine. In this case, only one effect is being "combined" since it may be desired to create a modified version of FE_CONSTANT_FORCE). This array must be terminated by zero. The next argument specifies a combination of forces in parallel; i.e., to invoke them simultaneously as opposed to sequentially (PSSEQUENTIAL). Next are the parameters duration, strength and axisID, the same arguments as used with PSStartEffect. The strength parameter has the special value PSVARIABLE, which will be passed when the force is invoked. Thus to run this force, the application programmer would write the following instructions:

```
PSPARAM strength = 500;   // force = 500
int nExpected;   // number of parameters expected, should be 1
PSStartEffect(FEPulseX, &strength, 1, &nExpected);
```

COMPOUND FORCES

If the application programmer desires to create a joystick pulse from an arbitrary direction like west-southwest, not just along the x-axis, a force effect called 2DPULSE could be created that allows the invocation of a 0.1 second pulse of specified strength in any direction. The programmer first creates FEPulseX as before, and FEPulseY similarly, then adds them together as follows:

```
struct EP_2DPULSE{        // Best to use a struct if>1 param
    PSPARAM Fx;           // strength for PulseX
PSPARAM Fy;               // strength for PulseY};
static EFFECTID FE2DPulse;   // ID for new 2DPULSE effect
const EP_2DPULSE EP2DPulse={   // static data to define 2D pulse effect
    PSVARIABLE,           // Fx is variable
    PSVARIABLE            // Fy too
};
// Assume FEPulseX and FEPulseY have been created already
EFFECTID idArry[3];       // array of 2 forces to combine, plus 0 at the end
idArray[0] = fePulseX;    // pulse effect in x-direction
idArray[1] = fePulseY;    // pulse effect in y-direction
idArray[3] = 0;           // marks end of array
// Now define the compound force FE2DPulse = PSCreateEffect(
    idArray,              // zero-terminated array of EFFECTIDs to combine
    PSPARALLEL,           // combine in parallel
    (PSPARAM*)&EP2DPulse, // parameters passed to constituent effects
    2,                    // number of parameters passed
    &nExpected            // returns number of parameters expected
);
```

First, a new struct EP_2DPULSE is defined to hold the parameters. Since PULSEX and PULSEY each expect one parameter, EP_2DPULSE has two parameters called Fx and Fy (named by the programmer). Both of these are specified as PSVARIABLE, so the real values are passed when the force is invoked. Static data are used to hold the new effect ID and the parameters that define it. Once the programmer has created FE2DPulse, it may be invoked like any other effect.

```
int nExpected;        // number of parms expected, should be 2
EP_2DPULSE params;    // 2DPULSE parameters
params.Fx = 300;      // x-component = 300
params.Fy = 400;      // y-component = 400
PSStartEffect (FE2DPulse, (PSPARAM*)¶ms, 2, &nExpected
);
```

A typical program would declare several EFFECTIDs with matching EP_ structs in its header file, then create the effects during an initialization sequence. The programmer may use static data to define the effects, or even put the data in a code segment to conserve space, since the values need never be modified.

```
// in game.h
EFFECTID FEEffect1;                  // EFFECTID for effect #1
typedef struct tagEPEffect1 {        // parameters used by effect #1
...
}EP_EFFECT1;
EFFECTID FEEffect2;                  // EFFECTID for effort #2
typedef struct tagEPEFFECT2 {        // parameters used by effect #2
.
.
.
}EP_EFFECT2; //in game.c
EP_EFFECT1 EPEffect1 = {   // static data to define effect #1
}; // in game.c EP_EFFECT2
EP_Effect2 = {      // static data to define effect #2
};
InitializeEffects()         // Called during startup
{
    FEEffect1 = PSCreateEffect( ... &EPEffect1 ...);
    FEEffect2 '2 PSCreateEffect( ... & EPEffect2 ...);
    .
    .
    .
}
```

BUILT-IN EFFECTS

There is no need to create 2DPULSE as illustrated by the previous programming example because it already exists. When the library routine PSInitialize is invoked, several force effects are automatically created. For example, FE_2DRUMBLE creates a 2D rumble effect. It has an EP_ struct to go with it:

```
struct EP_2DRUMBLE {      // parameters for FE_2DRUMBLE
    PSPARAM duration;     // duration in msec
    PSPARAM wavetype;     // type of wave
    PSPARAM ampX;         // x amplitude
    PSPARAM ampY;         // y amplitude
    PSPARAM period;       // period of oscillation, in msec
};
```

When an application program han no further need for a given force effect, it can be removed from the DSP's resident memory by calling PSDestroyEffect.

```
EFFECTID FEMyEffectcID;     // ID of your force effect
PSERR err;                  // error code
err = PSDestroyEffect (FEMyEffectID);
```

API LIBRARY CODE

The complete C language source program listing for the routines included in the library 42 illustrated in FIG. 1 is included in the microfiche appendix to this specification. Those programs may be statically linked to an application program using definitions defined in the header file PWSTICK.H. The API functions contained in the routine library 41 are implemented using C language routines also listed in the appendix. These API functions are summarized below:

| | |
|---|---|
| EventProc | Programmer#supplied event procedure |
| PSCreateEffect | Create a new force effect |
| PSDestroyEffect | Destroy a previously created force effect |
| PSGetDeviceInfo | Get information about DSP and joystick |
| PSGetError | Obtain the error generated by the last API function called |
| PSGetErrorMsg | Obtain an error message string associated with an error code |
| PSGetForce | Get current force |
| PSGetpos | Get current position |
| PSInitialize | Initialize API |
| PSIsEffectRunning | Find out if an effect is still running |
| PSMotorsOn | Turn the motors on or off |
| PSSetEventHandler | Set the event handler procedure |
| PSStartEffect | Start a force effect |
| PSStopEffect | Stop a force effect |

DIGITAL SIGNAL PROCESSOR PROGRAMS

The digital signal processor programs are organized to closely match the functions provided by the application program interface library routines which execute on the host personal computer as described above. The accompanying microfiche appendix contains a listing of C-language programs and header files. The C language instructions contained in this listing may be compiled using the TMS320C2x/C5x compiler and are based on the ANSI (American National Standards Institute) C standard. When compiled, these instructions may be executed on the TMS320C5x digital signal processor. Both the compiler and the digital signal processor integrated circuit, together with detailed documentation on both products, are available from the manufacturer, Texas Instruments, Inc. Additional information on alternative digital signal processors and related circuitry which may be used to implement the present invention may be found in the publication "Analog Interface and DSP Sourcebook" by Alan Clemens, (McGraw-Hill, London, 1993).

DSP INSTRUCTIONS

The description which follows summarizes how the instructions which execute on the digital signal processor 30 (as listed in the microfiche appendix) are structured, and how an application program 40 may interface with the DSP 30 by sending commands over the personal computer's serial port.

The DSP performs all calculations in the Cartesian domain. The origin of the joystick world is at the center of its rectangular workspace. Positive x points to the right and positive y points forward.

Each force effect is a collection of basic physical models used to calculate forces, such as a spring or a damper. Each force effect is uniquely identified by an effect ID, which is assigned by the DSP 30. The effect ID and a parameter list containing the values of parameters to be used in the models (such as stiffness K for a spring model) completely define the force model(s) used to generate forces.

There is a distinction between the definition and invocation of a force effect. When an effect is defined, it does not immediately become active and start to generate forces. An instance of it must be explicitly invoked by the application program in a process with the required parameters to generate forces in real time. A process ID is assigned to each instance of an effect invoked in process. This process ID is different from the effect ID and is used to terminate the instance of the effect in process. Terminating the active process for an effect instance does not eradicate the definition of the effect from memory; the same effect ID may be used again to invoke another process. Similarly, the same effect ID may be multiply invoked in more than one processes, each of which can be independently terminated with its unique process ID.

DEFINITIONS OF BASIC EFFECTS

The DSP software implements five basic force effects, used as building blocks for all custom effects. These basic effects are hardwired inside the DSP. The application program 40 cannot alter the definition of these effects. Each accepts a list of parameters which define the force models used. The effect IDs for these effects all start with "FE . . . ", which stands for "Force Effect". All effects have a duration parameter which allows the effect to self-terminate after a given period of time.

1. FEConstantForce (duration, axis $id_i$, $C_i$)
2. FESpring (duration, axis $id_i$, $K_i$, $center_i$)
3. FEDamper (duration, axis id, $B_i$)
4. FEWave (duration, axis $id_i$, wavetype, $C_i$, period)
5. FEObject (duration, objecttype, C,K,B, npoints, p1x, p1y, . . . )

Figure 2:
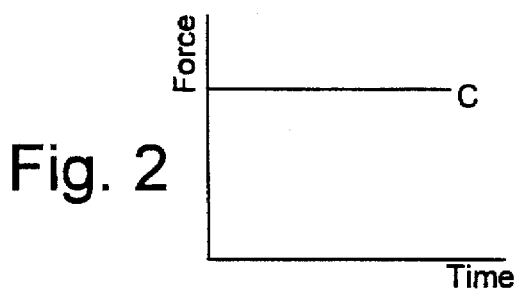
FIG. 2 is a graph illustrating the first primary force effect: a constant force of amplitude C.
Figure 3:
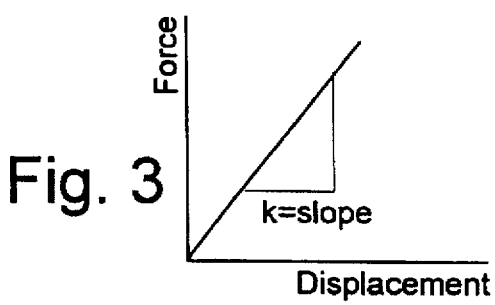
FIG. 3 is a graph depicting a second primary force effect: a spring force of spring constant K.
Figure 4:
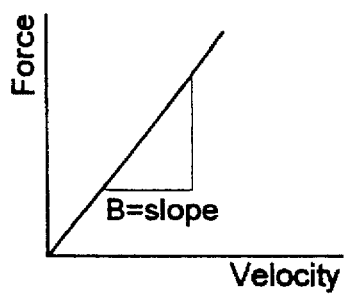
FIG. 4 is a graph showing a third primary force effect: a damping force having the velocity coefficient B.

FEConstantForce allows a force $F_i=C_i$ to be set up in either axis as depicted graphically in FIG. 2. FESpring sets up a virtual spring that pushes the stick back to a programmable center position according to Hooke's law, $Fi=K_i(x_i-center_i)$. The constant force is depicted in FIG. 3 of the drawings. FIG. 4 shows the damping force set by the function FEDamper which creates a virtual dashpot that resists movement by the equation for viscous damping, $F_i=-B_i$ v. These three basic effects are all specified axis by axis. To specify a homogeneous model (the same parameter will be used for X and Y), supply PS_HOMOGENEOUS as the axis ID.

Figure 5:
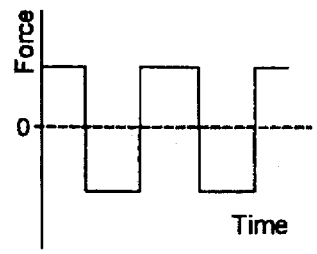
FIG. 5 is a graph illustrating a rumble force effect having a square waveform.
Figure 6:
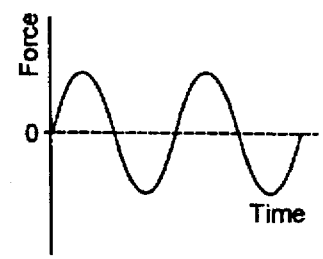
FIG. 6 is a graph of a rumble force effect having a sinusoidal waveform.
Figure 7:
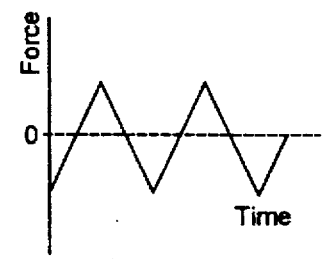
FIG. 7 is graph illustrating a rumble force effect having a triangular waveform.
Figure 8:
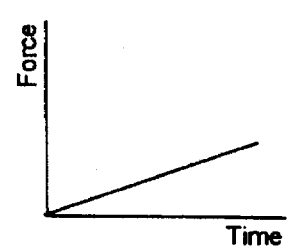
FIG. 8 is a graph of a time varying ramp-up force effect.
Figure 9:
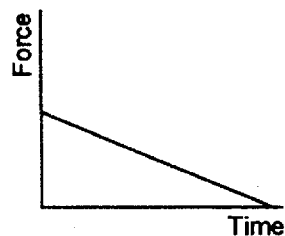
FIG. 9 is a graph showing a ramp-down force effect.

The fourth basic effect, FEWave, allows the user to set up a force profile axis by axis (X, Y or PS_HOMOGENEOUS). There are five wavetypes to choose from: square wave (PS_SQUARE) seen in FIG. 5, sine wave (PS_SINE) shown in FIG. 6, triangular wave (PS_TRIANGULAR) seen in FIG. 7, a directed force which ramp up (PS_RAMP_UP) as seen in FIG. 8 or ramps down (PS_RAMP_DOWN) as shown in FIG. 9. The first three waveforms are periodic, and the flag PS_RANDOMIZE_FREQUENCY may be added to the wavetype parameter to produce a rougher, more random rumble.

The amplitude parameter, $C_i$, may be used to set the phase of the periodic waves: a negative value would simply denote a phase lag of p in the waveform. The period parameter allows the user to program the frequency of the waves. The last two waveforms are non-periodic and the period parameter is a dummy placeholder that does not affect the forces generated.

Figure 10:
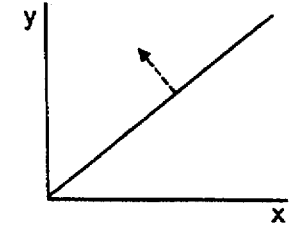
FIG. 10 is a schematic of a force effect object defined as a line (wall)
Figure 11:
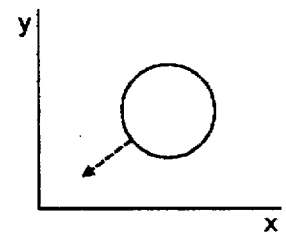
FIG. 11 is a schematic showing a circular force effect object.
Figure 12:
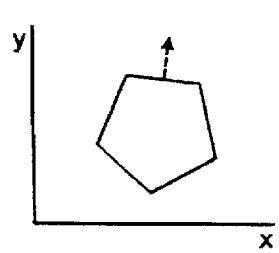
FIG. 12 is a schematic showing a convex polygonal force effect.

The fifth basic effect, FEObject, allows the user to set up virtual objects inside the joystick workspace to create such sensations as tapping against a stiff wall or feeling one's way around a spongy ball. Each object is defined by a geometrical element, which divides the 2D world of the joystick into an inside and an outside. There are three objecttypes: the infinite line (PS_LINE) illustrated in FIG. 10, the circle or hole (PS_CIRCLE) seen in the graph of FIG. 11, and the convex polygon (PS_POLYGON) shown in FIG. 12. The object effect computes forces if and only if the joystick ventures within the inside of an object. When the handle enters the object, a force is computed to push it out along the outward pointing surface normal of the closest edge or surface of the object.

The C, K and B parameters specify the homogeneous properties of the object. A positive C means that there will be a force pulse pushing the stick out of the object. A negative C is not recommended unless the value is set very close to 0 oz as it can generate severe instabilities. A non-zero K means that as the penetration of the stick into the object increases, the force pushing the stick out of the object increases as well. A non-zero B means that movement along the surface normal is impeded by a directional damper. A high K, low B and zero C constitutes a typical stiff springy object.

All forces are in the direction of the closest outward pointing surface normal. Since each object type takes a different number of points to specify the geometry, the npoints parameter defines the number of points to follow. For instance, a line is defined by two points, and a convex pentagon is defined by six points, the first and last points being repeated to close the polygon. The x and y coordinates of the points to follow are supplied after the npoints parameter.

CUSTOMIZED FORCE EFFECTS

Custom effects are defined by "embedding" or "combining" a list of basic effects or other previously defined custom effects to generate new, customized force effects. The parameters for the embedded effects can either be defined at the time the custom effect is defined, or they can be left variable, so that they can be supplied when the effect is invoked. It is therefore possible to create a "short hand" custom effect with predefined parameters that can be invoked rapidly with a minimum of data transfer during run time. Once the lists of embedded effects and parameters have been downloaded to the DSP, an effect ID is assigned and sent back to the personal computer 20 as a single byte. This effect ID will uniquely identify the custom effect created. Although many interesting behaviors can be achieved by only using the basic effects, there are many situations in which custom effects are useful or necessary, including:

(1) when a coordinated two degree-of-freedom force needs to be displayed (e.g. a pulse with magnitude (20,30));

(2) when the same parameters for an effect is used again and again and the communications bandwidth would degrade the performance of the application program(e.g. a homogeneous spring with K=20 oz/in);

(3) when a more complex force effect is desired (e.g. a spring-damper effect; a sequential spring-damper-rumble effect); or (4) when the parameter list becomes inhibitively long (e.g. a polygon with 6 vertices require 20 parameters transferred over the serial port).

The order of parameters for a custom effect is identialc to the order in which they appear in the embedded effects. The meaning of the parameters is therefor determined the the placement in the parameter list.

INVOKING A FORCE EFFECT IN A PROCESS

Each force effect (basic or customized) may be invoked in a process by supplying (1) its unique effect ID and (2) the required parameters. When an effect is invoked, the DSP 30 assigns and sends a process ID to the application program 40, which can be used to terminate the process. This ID is different from the effect ID. Terminating the process by its ID does not wipe out the effect used to start the process. However, deleting an effect from memory does wipe out all active instances of it in process.

INTERFACING WITH THE DSP

All communications with the DSP 30 and its processes take place through the serial port via the UART 35. The command set consists of ten commands which are defined by the header file PSINC.H set forth in full in the microfiche appendix.

The DSP program is essentially a state machine, waiting in a loop for a command plus additional information to come in through the serial port. The command and additional information are placed in a byte buffer, one unsigned byte (8 bits) at a time. The serial port is operating at 19200 BAUD.

The basic syntax of the serial byte stream is as follows:

| [0] | Command byte; |
|---|---|
| [1] | Number of bytes to follow; |
| [2 ... n] | Remaining bytes, containing the parameters for that command. |

All force effects are defined by a list of parameters. These parameters are all sent to the DSP 30 as 16 bit unsigned values. These parameters are either defined by the DSP software at the time a custom effect is created, or left variable and supplied when the effect is invoked. Since the serial communication channel deals in 8 bit nibbles, these 16 bit parameters are passed to the DSP in two unsigned Big Endian nibbles: MSB first, LSB last.

Most of the other information passed back and forth between the application program 40 and the DSP 30 are dealt in 8 bit nibbles. To make the most of the 16 bits available, all quantities are mapped to use the full range from 0 to 0xFFFF. The unsigned 16 bit value is scaled linearly to different quantities. For instance, for positional parameters, 0x0 scales to −10.00 inch, 0xFFFE scales to +10.00 inch, while 0x0 scales to 0 seconds and 0xFFFE scales to 65.534 seconds for time parameters. 0xFFFF is reserved.

There is a "magic" number that has special meaning when passed as a time parameter. The range for time parameters (period and duration) has a ceiling value of 65.534 seconds. To define or invoke an effect which goes on indefinitely, supply a duration of 0. This will signify that the effect needs to go on forever until it is manually terminated.

When a new effect is created or defined, the parameters for the effects which are embedded in it must be supplied. They may either be built into the resident DSP code, or they may be left variable by being set to a special reserved value, PS_VARIABLE (0xFFFF). Parameters designated to be variable become part of the expected parameter list for the new effect, to be supplied in the order that they appear in the embedded effects' parameter lists. For instance, if a 2D spring with infinite duration and fixed spring center but variable K were defined, the 2D spring would embed two basic springs. At the time the 2D spring is defined, the first embedded spring would have its duration predefined as 0 (forever), axis ID set to X, stiffness K set to PS_VARIABLE, and center set to 0x7FFF (0 for position). The second embedded spring would have its duration set to 0 (forever), axis ID set to Y, stiffness K set to PS_VARIABLE, and center set to 0x7fff (0 for position). The parameter list for the new effect (2D spring) now contains only two parameters: Kx and Ky, in that order.

COMMAND SET

The command set used by the routine library 42 to communicate with the DSP 30 via the UART 35 closely matches the set of API functions previously above. The commands sent to the DSP via the serial port are summarized below:

| | |
|---|---|
| CalibrateJoystick | Calibrates joystick called when driver executes PSInitialize. DSP returns byte when done. |
| CreateEffect | Creates new effects. DSP returns effect id. |
| DestroyEffect | Deletes defined effect(s). Basic effects cannot be deleted. |
| ForceOn | Enables motors |
| ForceOff | Disables motors |
| IsProcessRunning | Checks to see if a process is running. DSP returns status byte. |
| QueryDeviceInfo | Gets version number, manufacturer, degrees of freedom and max values. DSP returns device information bytes. |
| QueryErrorStatus | Gets error status stored from last call to CreateEffect or StartEffect. DSP returns 1 byte of error status. |
| QueryCurrentForce | DSP returns force in x,y. |
| QueryCurrentPos | DSP returns pos in x,y and the 16 bit button state. |
| StopProcess | Terminates a process. |

MECHANICAL CONSTRUCTION

The joystick mechanism contemplated by the invention employs a gimbal joystick mounting mechanism which permits forces to be applied to the joystick under the control of the dedicated digital signal processor DSP 30 in two degrees of freedom. FIGS. 13 through 17 of the drawings show this mounting mechanism in detail.

Figure 13:
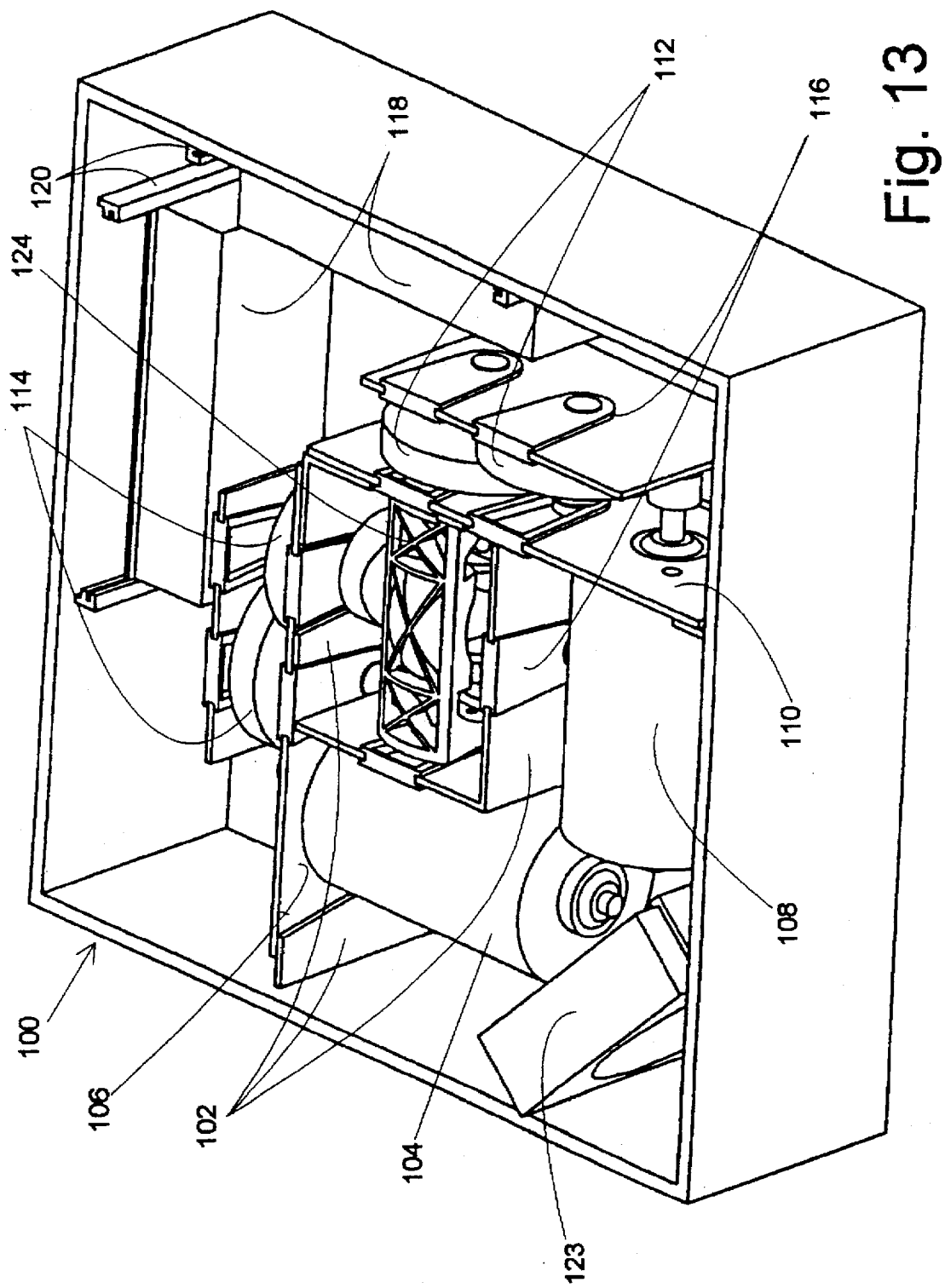
FIG. 13 is an isometric view of the joystick support mechanism.
Figure 14:
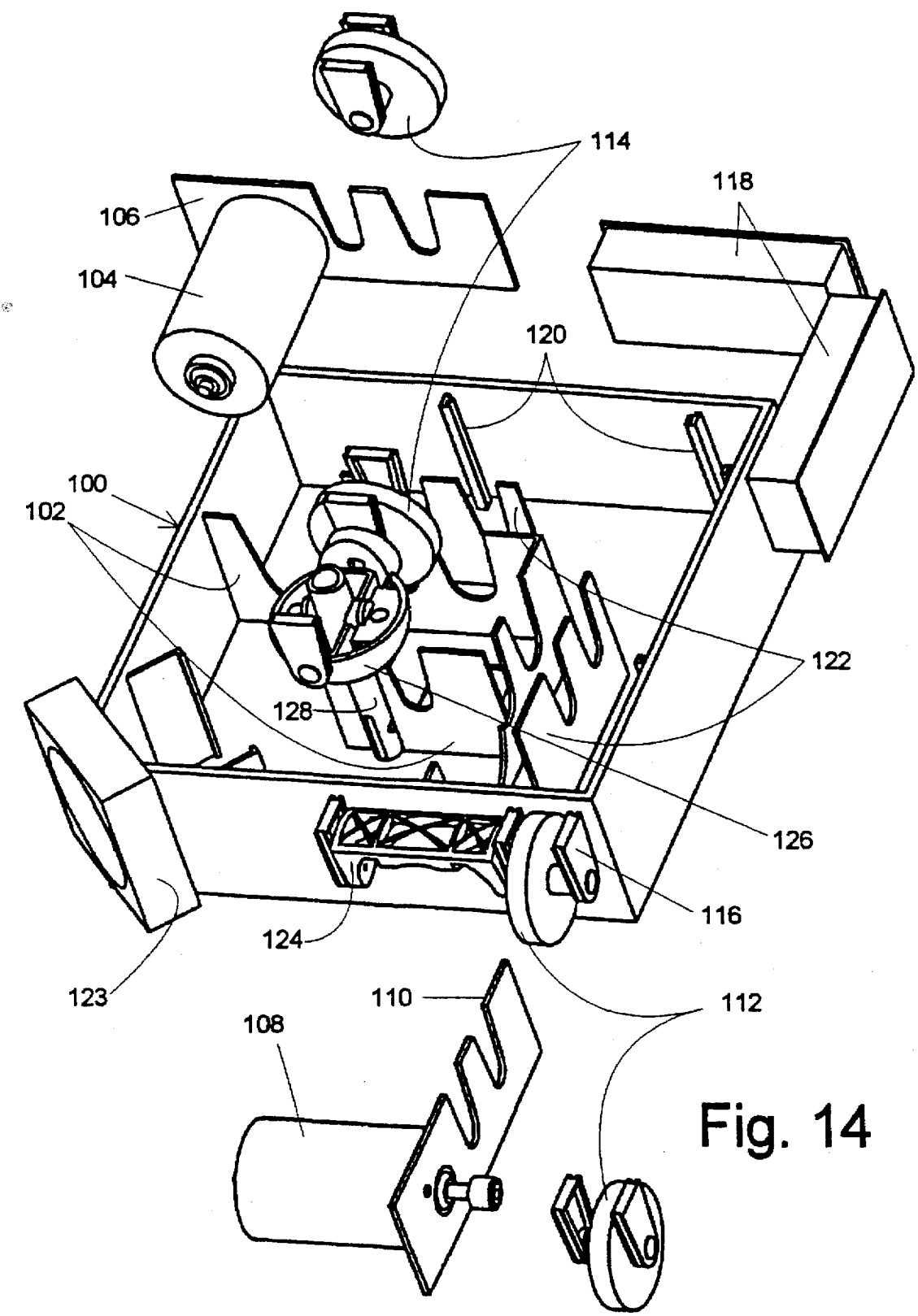
FIG. 14 is an exploded isometric view of the support mechanism.

FIG. 13 shows the underside of the assembled mechanism with the bottom cover (not shown) removed. FIG. 14 shows the same mechanism exploded to expose interior details of the assembly. The mounting mechanism is supported within a base shell indicated generally at 100 which includes interior walls 102 forming a central box structure adjacent drive motors 104 and 108. The drive motor 108 is secured in part by a motor bracket 106 which is in turn attached to an interior shell wall 102. Motor 108 is similarly secured by a motor bracket 110.

The motor 108 drives an output gear cluster indicated at 112 while the motor 104 drives a similar output gear cluster 114. The output gears 114 couple the motor 104 to a gimbal cup 126 seen in FIG. 14 and shown in more detail in FIG. 15. The output gears clusters 112 and 114 and the attached gimbal subassemblies are each supported by five bushings which are tapered and slotted to mate with tapered notches in the shell walls 102 and motor brackets 106 and 110 as seen in FIG. 13. are supported by a joystick rod 128 is pivotally attached to the gimbal cup which applies rotational forces to the rod 128 in one degree of freedom while permitting pivoting motion of the rod 128 in the other degree of freedom. The bottom end 133 of rod 128 is rounded to nest within and be engaged by a socket 135 formed in a U bracket 124 which is seen in detail in FIGS. 16 and 17. The U bracket 124 forms part of the assembly seen in FIG. 16 which couples the joystick rod 128 to the drive motor 108 via gear cluster 112.

The shell base 100 and its interior walls 102, as well as the motor brackets 106 and 110, the ten tapered bushings 116, both gimbal subassemblies and the gear clusters 112 and 114 are preferably constructed of molded plastic parts to reduce the weight and cost of the unit without sacrificing structural integrity. The gears 112 and 114 may alternatively be formed from powdered metal. Slotted mounting posts seen at 120 in FIG. 14 receive and retain a pair of electronic circuit board assemblies which house the system's electronics, including the signal processing circuitry, power supply and motor control amplifiers. A fan unit seen at 123 provides forced air cooling for the motors 104 and 108 as well as the electronic components on the boards 118.

The motors 104 and 108 may take the form of 24 volt DC carbon brush motors having a nominal maximum speed of 10,000 rpm and producing a torque of approximately 8.0 oz. inches at maximum efficiency, such at the model RS-775SH-4047 manufactured by Mabuchi Motors. With the motor current being controlled by the DSP 30 by means of pulse width modulation, and a gear ratio of approximately 8:1 provided by the output gear clusters 112 and 114, the mechanism provides adequate torque to provide strong force feedback effects to the user while, at the same time, providing the high speed response needed to provide high frequency "rumble effects" to the users hand. As discussed below, continuous maximum power output per motor may be limited to 85 watts per motor, 95 watts for both motors if both are applying force to the stick simultaneously, to provide a force to the stick center (4.5 inches above the gimbal center) of 2.5 lbs in any direction.

To prevent excessive power demands from being placed on the drive motors while providing a useful range of force effect intensities, limits may be imposed on both the total applied force and the parameter values which may be validly passed as requested force effects.

For spring effects, the spring constant parameter K may be varied from about 5 oz./in (barely perceptible to about 100 oz./in which provides an exceedingly stiff response in which it is very difficult to move the stick handle from the zero position. A value of 25 oz./in provides a weak centering spring, and a value of 50 oz./in provides a quite stiff spring response. The preferred embodiment establishes the maximum spring constant K at 200/oz.

For damper effects, a value for the B parameter of 0.5 oz.-sec/in provides barely perceptible damping, 1.0 oz.-sec/in provides noticeable damping, and 2.0 oz.-sec/in provides strong resistance to stick movement.

For arbitrary force impulseses, a parameter setting for Fset of 3.0 oz. provies barely perceptible effects, 16 oz. provides a gentle nudge, 32 oz. a strong impact. The preferred embodiment limits forces at a saturation level of 40 oz. (2.5 lbs) which provides a very strong pulse.

For wall objects, the parameter Kwall may ver from 20.0 oz/in which provides a barely perceptible wall boundary, 50.0 oz./in provides a spongy wall, 100 oz./in a springy stiff wall and 150 a crisply stiff wall.

The saturation force for each effect is set based on the continuous and peak ratings of the motors used, and should be reduced from the peak force values indicated to allow different force effects to be superimposed without placing excessive demands on the motors. A saturation forces of 2.5 lbs. (40 oz.) has been found to provide adequate performance for all force effects. Wave periods in the range 0.001 seconds (1,000 Hz) to 65 seconds have been found to provide an acceptable range of rumble and time delay effects.

It is to be understood that the joystick system that has been described in detail is merely illustrative on one application of the principles of the present invention. Numerous modifications may be made to the arrangements that have been described without departing from the true spirit and scope of the invention.

What is claimed is:

1. A programmable input and output device for use with a digital computer to which it is electrically coupled, said device comprising:

a. a moveable member manipulatable by a human user in at least one degree-of-freedom;

b. a sensor that produces position signals specifying a position of said moveable member with respect to said one degree-of-freedom;

c. a memory in which force effect definitions and for associating each of said stored definitions with a unique effect identifier for each force effect definition are stored;

d. a processor that is electrically coupled to the memory to access the force effect definitions in response to force commands received from the digital computer, said processor producing a control signal in response to the force commands; and e. an actuator, electrically coupled to the processor and mechanically coupled to said movable member, said actuator applying a force to said moveable member in said one degree-of-freedom in response to the control signal, a direction and a magnitude of said force being specified by at least one of said force effect definitions that is referenced by a corresponding effect identifier included in said force commands.

2. The programmable input and output device as set forth in claim 1, wherein said moveable member is manipulatable in plural degrees-of-freedom, and wherein at least one of said effect definitions includes at least one degree-of-freedom identifier and one or more parameters associated therewith, and wherein said actuator applies a force to said moveable member in the degree-of-freedom specified by said degree-of-freedom identifier, said force having a magnitude and a direction specified by said one or more parameters.

3. The programmable input and output device as set forth in claim 2, wherein at least one of said force effect definitions is a compound force effect definition, which includes information specifying a magnitude and a direction of the force to be applied in each of the plural degrees-of-freedom, and wherein said actuator applies a compound force to said manipulatable member in said plural degrees-of-freedom simultaneously, as specified by said compound force effect definition.

4. The programmable input and output device as set forth in claim 1, wherein at least one of said force effect definitions includes a duration parameter, and wherein said reduces the application of said force as a function of the time elapsed after the receipt of a force command containing an effect identifier, which specifies a force effect definition including said duration parameter.

5. The programmable input and output device as set forth in claim 1, wherein the control signal produced by said processor in response to a plurality of concurrent force commands causes the actuator to apply a motive force to said moveable member which is an additive combination of forces specified by said plurality of concurrent force commands.

6. The programmable input and output device as set forth in claim 1, wherein at least one of said force effect definitions includes a time-varying waveform definition, and wherein the control signal produced by said processor in response to a force command containing a force effect definition that includes said time-varying waveform definition causes said actuator to apply a time-varying force to said moveable member in accordance with said time-varying waveform definition.

7. The programmable input and output device as set forth in claim 6, wherein said time-varying waveform definition includes direction, magnitude, frequency, and waveshape parameter values to which said processor responds by producing a control signal that causes the actuator to apply said time-varying force in a direction and with a magnitude, frequency, and waveshape specified by said direction, magnitude, frequency, and waveshape parameter values, respectively.

8. The programmable input and output device as set forth in claim 1, wherein at least one of said force effect definitions identified by one of said effect identifiers is a partial force effect definition, which includes a first set of one or more force-defining parameters;

wherein selected ones of said force commands include an identifier, which specifies one of said partial force effect definitions and a second set of one or more force-defining parameters; and wherein said processor produces a control signal in response to said selected ones of said force commands that causes the actuator to apply a motive force in accordance with a combination of force-defining parameters included in both said first and said second sets.

9. The programmable input and output device as set forth in claim 1, wherein a portion of the memory is non-volatile and said portion is used for permanently storing a plurality of predetermined standard force effect definitions, and wherein in response to a force command signal containing an effect identifier, which specifies a selected one of said standard force effect definitions, said processor produces a control signal that causes the actuator to apply a force to said moveable member as specified by said selected one of said predetermined standard force effect definitions.

10. The programmable input and output device as set forth in claim 1, wherein said processor receives a plurality of said force effect definitions from said computer and stores said plurality of force effect definitions in said memory.

11. The programmable input and output device as set forth in claim 1, wherein at least selected ones of said force effect definitions include a spring force parameter, and wherein said processor produces a control signal causing said actuator to apply a spring force to said moveable member having a magnitude proportional to a displacement of said moveable member from a predetermined position.

12. The programmable input and output device as set forth in claim 1, wherein at least selected ones of said force effect definitions include a constant force parameter, and wherein said processor produces a control signal causing said actuator to apply a constant force to said moveable member, said constant force having a magnitude and a direction indicated by said constant force parameter.

13. The programmable input and output device as set forth in claim 1, wherein the processor determines a velocity of said moveable member, at least selected ones of said force effect definitions including a damping force parameter said processor determining a control signal that causes said actuator to apply a damping force to oppose the movement of said moveable member, said damping force having a magnitude that varies as a function of said velocity signal and said damping force parameter.

14. The programmable input and output device as set forth in claim 1, wherein said moveable member is manipulatable in plural degrees-of-freedom within a predetermined total region of movement, and wherein at least selected ones of said force effect definitions are each an object force definition comprising geometric parameters defining a subregion within said total region and force specification parameters, and wherein said processor produces a control signal causing said actuator to urge said moveable member in a direction normal to a boundary of said subregion with a force having a magnitude specified by said force specification parameters.

15. The programmable input and output device as set forth in claim 14, wherein said force specification parameters include a constant indicating a magnitude of a constant force, a stiffness coefficient, and a damping coefficient, and wherein said processor produces a control signal in response thereto that cause said actuator to urge said member in a direction normal to said boundary with a force, which combines the constant force having a magnitude that varies as a function of said constant, a spring force having a magnitude that varies as a function of a product of said stiffness coefficient and a displacement of said moveable member from a predetermined position, and a damping force having a magnitude that varies as a function of a product of said damping coefficient and a velocity of said moveable member.

16. The programmable input and output device as set forth in claim 1, wherein said processor transmits information to said computer specifying the position of said moveable member, and the magnitude and direction of the force applied to said moveable member by said actuator.

17. The programmable input and output device as set forth in claim 1, wherein said processor determines a velocity of said moveable member as a function of the position signals.

18. The programmable input and output device as set forth in claim 1, wherein said processor determines an acceleration of said moveable member as a function of the position signals.

19. A programmable input and output device for use with a digital computer to which it is electrically coupled, said device comprising:

a. a moveable member manipulatable by a user in a plurality of degrees-of-freedom;

b. a sensor that produces position signals specifying a position of said moveable member with respect to said plurality of degrees-of-freedom;

c. a memory in which force effect definitions with a unique effect identifier for each force effect definition are stored;

d. a processor that is electrically coupled to the memory to access the force effect definitions in response to force commands received from the digital computer, said processor producing a control signal in response to the force commands; and e. an actuator, electrically coupled to the processor and mechanically coupled to said movable member, said actuator applying a force to said movable member in at least one of said plurality of degrees-of-freedom in response to the control signal, a direction and a magnitude of said force being specified by at least one of said force effect definitions that is referenced by a corresponding effect identifier included in said force commands.

* * * * *

UNITED STATES PATENT AND TRADEMARK OFFICE
CERTIFICATE OF CORRECTION

PATENT NO. : 5,742,278
DATED : April 21, 1998
INVENTOR(S) : Chen et al.

It is certified that error appears in the above-identified patent and that said Letters Patent is hereby corrected as shown below:

| | |
|---|---|
| Section [57], Abstract, line 15 | "forces" should read --force-- |
| Column 3, line 45 | "preferrably" should read --preferably-- |
| Column 4, line 36 | "lim9ited" should read --limited-- |
| Column 5, line 57 | "paramerters" should read --parameters-- |
| Column 7, line 34 | "EPPulseX '2 {;" should read --EPPulseX = {;-- |
| Column 9, line 30 | "effort" should read --effect-- |
| Column 9, line 41 | "FEEffect2 '2" should read --FEEffect2 =-- |
| Column 9, line 65 | "han" should read --has-- |
| Column 10, line 1 | "FEMyEffectcID" should read --FEMyEffectID-- |
| Column 10, line 27 | "PSGetpos" should read --PSGetPos-- |
| Column 11, line 21 | "processes" should read --process-- |
| Column 13, line 4 | "identialc" should read --identical-- |
| Column 13, line 6 | delete "the" (third occurrence) |

UNITED STATES PATENT AND TRADEMARK OFFICE
CERTIFICATE OF CORRECTION

PATENT NO. : 5,742,278
DATED : April 21, 1998
INVENTOR(S) : Chen et al.

It is certified that error appears in the above-identified patent and that said Letters Patent is hereby corrected as shown below:

| | |
|---|---|
| Column 15, line 27 | "at" (second occurrence) should read --as-- |
| Column 15, line 59 | "impulseses" should read --impulses-- |
| Column 15, line 60 | "provies" should read --provides-- |
| Column 16, lines 26-27 (Claim 1, lines (9-10) | after "definitions" delete "and for associating each of said stored definitions" |
| Column 16, line 37 (Claim 1, line 19) | "movable" should read --moveable-- |
| Column 16, line 65 (Claim 4, line 3) | after "said" insert --processor-- |

Signed and Sealed this

Tenth Day of November 1998

BRUCE LEHMAN

*Attest:*

*Attesting Officer*        Commissioner of Patents and Trademarks